United States Patent Office 3,336,269
Patented Aug. 15, 1967

3,336,269
PREPARATION OF ACRYLAMIDE-TYPE
WATER-SOLUBLE POLYMERS
Daniel J. Monagle and Walter P. Shyluk, Wilmington, Del., assignors to Hercules Incorporated, a corporation of Delaware
No Drawing. Filed Apr. 7, 1964, Ser. No. 358,069
19 Claims. (Cl. 260—79.3)

The present invention relates to a precipitation process of preparing acrylamide-type polymers which are soluble in water but insoluble in aqueous tertiary butanol. More particularly, the present invention relates to such a process wherein the vinyl monomer is dissolved in aqueous tertiary butanol and polymerized therein either in the presence or absence of initiator and in the substantial absence of air, to give polymer products in a readily filterable form.

By the term "high" molecular weight as used herein is meant a reduced specific viscosity (RSV) of at least 4 (usually 5–15) as measured at 25° C. on 0.1% solutions of the polymers of the present invention in 0.1 molar aqueous potassium chloride. When this is expressed as viscosity in centipoise, "high" molecular weight as used herein means a cps. of at least about 30. The term "polymer" is used herein to include both homopolymers and copolymers. The term "acrylamide-type polymers" as used herein is intended to include both acrylamide-type polymers and substituted acrylamide-type polymers, including without limitation of the foregoing methacrylamide and N-isopropyl acrylamide.

A method which is applicable in most cases for defining the molecular weight of polymers is a viscosity measurement. Depending on the type polymer involved, this measurement is usually made when the polymer is in a molten condition or is dissolved in a suitable solvent. When the polymer is water-soluble, the methods most frequently employed for measuring molecular weight are reduced specific viscosity (RSV) as measured in a capillary tube (e.g. an Ostwald or Ubbelohde tube) and apparent viscosity as measured by an instrument such as a Brookfield viscometer. Although the RSV method is accepted as a method for calculating the average molecular weight of a polymer, this method depends upon the polymer being completely soluble in the solvent used for the measurement as illustrated by the equation shown below in which $\eta_{sp}$ (i.e. the specific viscosity) is calculated $$RSV = \frac{\eta_{sp}}{C}$$

where $$\eta_{sp} = \frac{\eta - \eta_0}{\eta_0} = \frac{\eta}{\eta_0} - 1$$

from the measured flow time of the dilute polymer solution ($\eta$) divided by the flow time of the solvent ($\eta_0$), minus one. Thus, if the measurement is made before a homogeneous solution is attained, that measurement must be considered invalid unless special precautions are made to determine the exact concentration of polymer in solution.

As is often the case with high molecular weight acrylamide-type polymers, completely homogeneous solutions cannot readily be obtained. Thus, the use of an RSV measurement alone may not adequately describe the molecular weights of the polymers involved. For this reason, it is desirable to give the Brookfield viscosities of those polymers whose aqueous solutions contain more difficultly soluble gels.

The method used to determine the RSV values given herein was as follows: 0.1 g. dry polymer is dissolved to mark in a 100 ml. volumetric flask with 0.1 M KCl. The solution is allowed to equilibrate to temperature in a bath at 25° C. The solution is transferred to a Ubbelohde-type viscometer and the flow time between two points recorded. The specific viscosity, $\eta_{sp}$, is calculated from the measured flow time of the polymer solution divided by the flow time of the solvent alone, minus one (Equation 1).

$$\eta_{sp} = \frac{\eta - \eta_0}{\eta_0} = \frac{\eta}{\eta_0} - 1 \quad \text{(Equation 1)}$$

The reduced specific viscosity is determined by dividing the concentration of the solution into the specific viscosity (Equation 2).

$$RSV = \frac{\eta_{sp}}{C} \quad \text{(Equation 2)}$$

Polymers which may be prepared according to the present invention include those represented by the following three structural formulas:

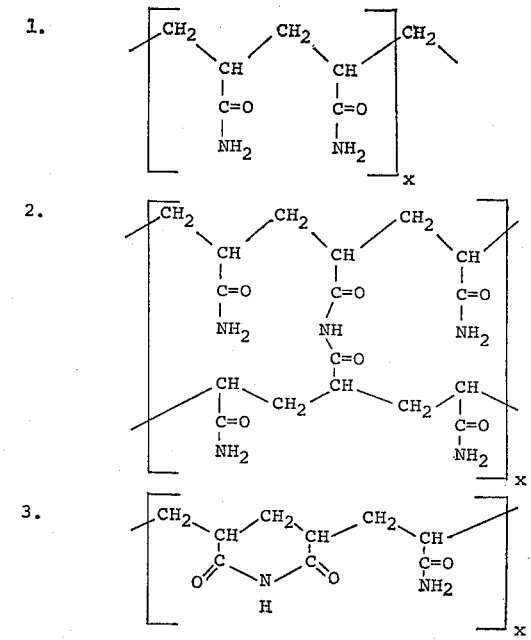

The actual structure of the polymer will depend upon whether the polymerization of the vinyl monomer takes place in the normal head-to-tail manner so as to produce a linear polymer (structural Formula 1) or in a manner resulting in intermolecular or intramolecular imide formation (structural Formulas 2 and 3, respectively). As is shown above, structural Formulas 2 and 3 actually represent cross-linked materials. While linear polymers usually are quite soluble in water, cross-linked polymers are usually difficultly soluble in water. The degree of solubility and the viscosity will depend upon the degree of intermolecular and/or intramolecular cross-linking involved. It is well known that relatively small amounts of divinyl monomer (included in a vinyl polymerization) produces polymers whose aqueous solutions have unusually high viscosity due to highly swollen gels resulting from a small number of cross-links. At the other extreme, polymers produced from divinyl monomers usually are insoluble, or swell to only a slight extent, and their aqueous solutions exhibit very low viscosity.

Although the prior art discloses numerous methods for preparing vinyl-type polymers, relatively few of these are applicable for water-soluble polymers. One prior art type process for preparing such polymers is know as a solution type process, having at least one virtue in that it enables a control over the exothermic polymerization reaction. However, these solution processes would be significantly improved if a means could be found to limit the viscosity increase of the reaction mixture during the polymerization so that the process would be more practical from the standpoint of handling during the polymerization and the subsequent isolation and more versatile from the standpoint of being able to produce higher molecular weight polymers.

In the solution type process, monomer is dissolved in an inert solvent and subsequently polymerized. The inert solvent may be an organic diluent or, in the case of water-soluble polymers, water. The reaction mixture thus obtained is quite viscous, the vsicosity depending on the nature of the polymer, its concentration and its molecular weight. Such a mixture may be subsequently handled by any of the known techniques (i.e., roll drying, spray drying, precipitation and the like) to obatin a dry product. These techniques for isolation of product are usually inconvenient in that they are expensive, involving major equipment expenditures or require large volumes of precipitant.

It has been found, according to the present invention, that the limitations of the prior art solution type processes can be overcome or minimized in preparing water-soluble polymers by carrying out a precipitation polymerization process which comprises polymerizing a solution of acrylamide-type monomer in aqueous tertiary butanol, which is a solvent for these type monomers but a non-solvent for the resulting polymer, to give a polymeric product which can be isolated by filtration.

Monomers applicable in the present invention include those selected from the group consisting of (1) acrylamide alone and (2) acrylamide as comonomer with the following: (a) acrylonitrile, (b) vinyl monomers containing hydrophilic salt groups including ($b^1$) vinyl sodium carboxylates, e.g. sodium acrylate, sodium methacrylate, ($b^2$) vinyl sodium sulfonates, e.g. sodium ethylene sulfonate, ($b^3$) vinyl quaternary ammonium salts including those derived from dialkylaminoalkyl methacrylate (e.g. β-methacryloyloxyethyltrimethylammonium methyl sulfate), dialkylaminoalkyl acrylate, dialkylaminoalkyl vinyl ether, ($b^4$) vinyl pyridinium salts including those derived from 2-vinyl pyridine, 4-vinyl pyridine, 2-methyl 5-vinyl pyridine (e.g. 1,2-dimethyl-5-vinyl pyridinium methyl sulfate), 2-vinyl 5-ethyl pyridine, ($b^5$) vinyl sulfonium salts including those analogous to the quaternary ammonium salts in ($b^3$) above, and (c) a vinyl pyrrolidone.

Several of the conditions of the precipitation polymerization process of the present invention are critical and these conditions will now be discussed.

The solvent must be aqueous tertiary butanol (i.e. mixtures of tertiary butanol and water). Various other solvents were tried but found to be unsuitable. Other solvents tried included aqueous methanol, aqueous ethanol, and aqueous isopropanol. N-butanol and the higher homologs were found to be unsatisfactory primarily because they were immiscible with water at the alcohol concentrations applicable herein.

The concentration of tertiary butanol in said solvent must be 35%–70%, preferably 40%–55%, by weight of said mixture. When the concentration of tertiary butanol in the solvent is below 35%, the polymeric product forms as a gel mass instead of precipitating as discrete particles according to the present invention. When the concentration of tertiary butanol in the solvent is above 70%, the polymer product forms as undesirably large, sticky, gel particles instead of precipitating as desirably small, discrete particles according to the present invention.

As is well known, the molecular weight of polymers varies directly with the monomer concentration used in making the polymer. If higher molecular weight polymers are desired, the monomer concentration should be about 10%–30%, preferably 15%–25%, by weight of the total polymerization reaction mixture. When the monomer concentration is above about 30%, the polymeric product forms as undesirably large, sticky gel particles instead of precipitating as desirably small, discrete particles according to the present invention. If low molecular weight polymers are desired, one would use monomer concentrations below about 10%. However, the polymerization becomes less practical as the monomer concentration goes below about 4%–5%. When using monomer concentrations below about 4%–5%, the polymeric product is apt to be produced in the form of a suspension instead of the desired precipitate in accordance with the present invention.

The monomers used must be soluble in the water-tertiary butanol mixture and the polymeric products prepared from these monomers must be insoluble in said mixture. Such polymerizations must be carried out in the substantial absence of air, the usual methods for removing air from the polymerization system being employed, e.g. by nitrogen displacement.

Although polymerization temperature and time in accordance with the present invention are not critical nor per se a part of the present invention, they are significant as anyone skilled in the art will appreciate. As a general rule, which likewise is well known in the art, molecular weight varies inversely with temperature and, to a lesser extent, time.

The polymerization temperature is dependent on the particular initiator used in the system. Temperature of about 20° C.–80° C. have given satisfactory results with potassium persulfate in accordance with the present invention. Preferably a temperature of about 45° C.–55° C. will be employed. Temperature below 20° C. can be used if the increased time can be tolerated. When the temperature is above about 80° C., the process of this invention is less practical because the polymerization must be carried out under pressure.

The polymerization reaction may be carried out either in the absence or presence of a polymerization initiator, but the use of a polymerization initiator is preferred. Both the amounts and types of free radical initiators applicable are well known in the art. If an initiator is used, amounts up to 0.5 weight percent, based on the monomer, give good results. Preferably, the amount of initiator used will be about 0.05%–0.2%. Peroxygen compounds, in general, function well as initiators. These peroxygen compounds include, for example, ammonium persulfate, potassium persulfate, and hydrogen peroxide. α,α-Azo-bis-isobutyronitrile also works well as an initiator. An initiator may be used alone or in combination with an activator to reduce the induction period of the polymerization reaction. Likewise, these activators are well known in the art. These activators form a redox system with an intiator. Sodium bisulfite and ferrous chloride activators have been used quite successfully in combination with potassium persulfate and hydrogen peroxide initiators, respectively, in accordance with the present invention.

The following examples, wherein parts and percent are by weight unless otherwise indicated, illustrate various specific embodiments of the present invention. When both monomer and initiator are used they are dissolved in the aqueous tertiary butanol solvent. Air was removed from the polymerization reaction vessel by displacing the air with nitrogen. Activator, when used, was added at this time. The polymerization was carried out under the temperature, time and other conditions specified in Table 1 hereinafter. Agitation was maintained throughout the polymerization. The polymerization reaction mixture was filtered, the polymeric product dried and its viscosity measured. Further details appear in Tables 1–5 hereinafter.

TABLE 1.—PRECIPITATION POLYMERIZATION PROCESS OF MAKING ACRYLAMIDE-TYPE WATER-SOLUBLE POLYMERS
[Variable: TBA concentration]

| Ex. No. | Monomer(s) Name | Monomer(s) Conc., Percent [1] | TBA Conc., Percent [2] | Initiator Name | Initiator Conc., Percent [3] | Activator | Temp., °C. | Viscosity [4] RSV | Viscosity [4] Cps. | Remarks |
|---|---|---|---|---|---|---|---|---|---|---|
| 1 | ([5]) | 20 | 30 | $K_2S_2O_8$ | 0.27 | None | 50 | 11.0 |  | Hazy gel—inoperable. |
| 2 | ([5]) | 20 | 35 | $K_2S_2O_8$ | 0.27 | None | 50 | 9.5 |  | Slurry of polymer particles—good results. |
| 3 | ([5]) | 20 | 37 | $K_2S_2O_8$ | 0.27 | None | 50 | 11.0 |  | Do. |
| 4 | ([5]) | 20 | 40 | $K_2S_2O_8$ | 0.14 | None | 50 | 8.8 |  | Do. |
| 5 | ([5]) | 20 | 50 | $K_2S_2O_8$ | 0.14 | None | 50 | 7.9 |  | Do. |
| 6 | ([5]) | 20 | 55 | $K_2S_2O_8$ | 0.14 | None | 50 |  | 462 | Do. |
| 7 | ([5]) | 20 | 65 | $K_2S_2O_8$ | 0.14 | None | 50 |  | 114 | Do. |
| 7 | ([5]) | 20 | 70 | $K_2S_2O_8$ | 0.14 | None | 50 |  | 322 | Do. |

[1] Percent by weight of total polymerization reaction mixture.
[2] Percent by weight of tertiary butanol based on tertiary butanol-water mixture.
[3] Percent by weight based on monomer.
[4] All cps. viscosity values were measured on a 1% aqueous solution of the polymer at 25° C. with a standard Brookfield Synchro-Lectric LVF Viscometer.
[5] 85% acrylamide—15% β-methacryloyloxyethyltrimethylammonium methyl sulfate (MTMMS).

TABLE 2.—PRECIPITATION POLYMERIZATION PROCESS OF MAKING ACRYLAMIDE-TYPE WATER-SOLUBLE POLYMERS
[Variable: Monomer concentration]

| Ex. No. | Monomer(s) Name | Monomer(s) Conc., Percent | TBA Conc., Percent | Initiator Name | Initiator Conc., Percent | Activator | Temp., °C. | Viscosity RSV | Viscosity Cps. | Remarks |
|---|---|---|---|---|---|---|---|---|---|---|
| 9 | ([1]) | 10 | 43 | $K_2S_2O_8$ | 0.20 | None | 50 | 5.5 |  | Slurry of polymer particles—good results |
| 10 | ([1]) | 13 | 43 | $K_2S_2O_8$ | 0.20 | None | 50 | 7.2 |  | Do. |
| 11 | ([1]) | 15 | 37 | $K_2S_2O_8$ | 0.20 | None | 50 | 7.8 |  | Do. |
| 12 | ([1]) | 20 | 37 | $K_2S_2O_8$ | 0.20 | None | 50 | 10.2 |  | Do. |
| 13 | ([1]) | 22 | 43 | $K_2S_2O_8$ | 0.20 | None | 50 | 11.2 |  | Do. |
| 14 | ([1]) | 25 | 37 | $K_2S_2O_8$ | 0.20 | None | 50 |  | 80 | Do. |
| 15 | ([1]) | 30 | 43 | $K_2S_2O_8$ | 0.20 | None | 50 | 10.2 |  | Do. |

[1] 85% acrylamide—15% β-methacryloyloxyethyltrimethylammonium methyl sulfate (MTMMS).

TABLE 3.—PRECIPITATION POLYMERIZATION PROCESS OF MAKING ACRYLAMIDE-TYPE WATER-SOLUBLE POLYMERS
[Variable: Monomer]

| Ex. No. | Monomer(s) Name | Monomer(s) Conc., Percent | TBA Conc., Percent | Initiator Name | Initiator Conc., Percent | Activator | Temp., °C. | Viscosity RSV | Viscosity Cps. | Remarks |
|---|---|---|---|---|---|---|---|---|---|---|
| 16 | ([1]) | 20 | 38 | $K_2S_2O_8$ | 0.05 | None | 50 | 10.1 |  | Slurry of polymer particles—good results. |
| 17 | ([2]) | 20 | 38 | $K_2S_2O_8$ | 0.05 | None | 50 |  | 40 | Do. |
| 18 | ([3]) | 20 | 38 | $K_2S_2O_8$ | 0.05 | None | 50 |  | 60 | Do. |
| 19 | ([4]) | 20 | 38 | $K_2S_2O_8$ | 0.05 | None | 50 |  | 1,725 | Do. |
| 20 | ([5]) | 20 | 38 | $K_2S_2O_8$ | 0.05 | None | 50 |  | <10 | Slurry of polymer particles—but low mol. wt. |
| 21 | ([6]) | 20 | 38 | $K_2S_2O_8$ | 0.05 | None | 50 |  | <10 | Do. |
| 22 | ([7]) | 20 | 40 | $K_2S_2O_8$ | 0.1 | None | 50 |  | 80 | Do. |
| 23 | ([8]) | 20 | 40 | $K_2S_2O_8$ | 0.1 | None | 50 |  | 25 | Do. |

[1] Acrylamide.
[2] 90% acrylamide—10% acrylic acid.
[3] 90% acrylamide—10% acrylonitrile.
[4] 85% acrylamide—15% MTMMS.
[5] 90% acrylamide—10% DMPMS.
[6] 80% acrylamide—20% vinyl pyrrolidone.
[7] 63% methacrylamide—37% MTMMS.
[8] 63% methacrylamide—37% DMPMS.
NOTE.—DMPMS is 1,2-dimethyl-5-vinyl pyridinium methyl sulfate.

TABLE 4.—PRECIPITATION POLYMERIZATION PROCESS OF MAKING ACRYLAMIDE-TYPE WATER-SOLUBLE POLYMERS
[Variable: Initiator-activator system]

| Ex. No. | Monomer(s) Name | Monomer(s) Conc., Percent | TBA Conc., Percent | Initiator Name | Initiator Conc., Percent | Activator Name | Activator Conc., Percent | Temp., °C. | RSV | Remarks |
|---|---|---|---|---|---|---|---|---|---|---|
| 24 | ([1]) | 20 | 40 | ([2]) | 0.20 | None |  | 50 | 13.0 | Slurry of Polymer particles—good results. |
| 25 | ([1]) | 20 | 40 | ([2]) | 0.40 | None |  | 50 | 6.0 | Do. |
| 26 | ([1]) | 20 | 40 | $H_2O_2$ | 0.20 | None |  | 50 | 10.0 | Do. |
| 27 | ([1]) | 20 | 40 | $H_2O_2$ | 0.40 | None |  | 50 | 5.7 | Do. |
| 28 | ([1]) | 20 | 40 | $H_2O_2$ | 0.05 | 2 | 0.40 | 50 | 6.8 | Do. |
| 29 | ([1]) | 20 | 40 | $H_2O_2$ | 0.20 | 2 | 0.40 | 50 | 8.6 | Do. |
| 30 | ([1]) | 20 | 40 | $K_2S_2O_8$ | 0.27 | None |  | 50 | 7.6 | Do. |
| 31 | ([1]) | 20 | 40 | $K_2S_2O_8$ | 0.14 | $NaHSO_3$ | 0.02 | 50 | 13.4 | Do. |
| 32 | ([1]) | 20 | 40 | $K_2S_2O_8$ | 0.14 | $NaHSO_3$ | 0.05 | 50 | 10.0 | Do. |

[1] 85% acrylamide—15% β-methacryloyloxyethyltrimethylammonium methyl sulfate (MTMMS).
[2] Azo-bis isobutyronitrile.

TABLE 5.—PRECIPITATION POLYMERIZATION PROCESS OF MAKING ACRYLAMIDE-TYPE WATER-SOLUBLE POLYMERS
[Variable: Polymerization temperature]

| Ex. No. | Monomer(s) Name | Monomer(s) Conc., Percent | TBA Conc., Percent | Initiator Name | Initiator Conc., Percent | Activator | Reaction Temp., °C | Reaction Time | RSV | Remarks |
|---|---|---|---|---|---|---|---|---|---|---|
| 31 | (¹) | 20 | 36 | K₂S₂O₈ | 0.135 | None | 0 | 7 days | 8.7 | Slurry of polymer particles—good results. |
| 32 | (¹) | 20 | 36 | K₂S₂O₈ | 0.135 | None | 24 | 20 hrs | 6.5 | Do. |
| 33 | (¹) | 20 | 36 | K₂S₂O₈ | 0.135 | None | 45 | 2-4 hrs | 10.2 | Do. |
| 34 | (¹) | 20 | 36 | K₂S₂O₈ | 0.135 | None | 60 | 2-4 hrs | 7.4 | Do. |
| 35 | (¹) | 20 | 36 | K₂S₂O₈ | 0.135 | None | 80 | 2 hrs | 4.8 | Do. |

¹ 85% acrylamide—15% β-methacryloyloxyethyltrimethylammonium methyl sulfate (MTMMS)

What we claim and desire to protect by Letters Patent is:

1. Process of preparing water-soluble polymers which comprises dissolving acrylamide type monomer having the formula:

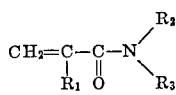

wherein $R_1$, $R_2$ and $R_3$ are each selected from the group consisting of hydrogen and lower alkyl in a tertiary butanol-water mixture wherein the amount of tertiary butanol is 35%–70% by weight of said mixture and allowing the monomer to polymerize to give polymers which precipitate out of said tertiary butanol-water mixture in readily filterable granular form, the mount of monomer being 5%–30% by weight of the polymerization reaction mixture.

2. Process of preparing water-soluble polymers which comprises dissolving acrylamide type monomer having the formula:

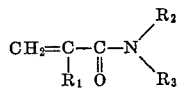

wherein $R_1$, $R_2$ and $R_3$ are each selected from the group consisting of hydrogen and lower alkyl in a tertiary butanol-water mixture wherein the amount of tertiary butanol is 35%–70% by weight of said mixture and allowing the monomer to polymerize at a temperature of about 25° C. to the reflux temperature of the polymerization reaction mixture to give polymers which precipitate out of said tertiary butanol-water mixture in readily filtrable granular form, the amountof monomer being 5%–30% by weight of the polymerization reaction mixture.

3. Process of claim 2 wherein the amount of tertiary butanol is 40%–55%.

4. Process of claim 2 wherein the amount of monomer is 15%–30%.

5. Process of claim 2 wherein the monomer is acrylamide.

6. Process of claim 2 wherein the monomer is a vinyl monomer containing hydrophilic salt groups together with acylamide.

7. Process of claim 2 wherein the monomer is a vinyl quaternary ammonium salt together with acrylamide.

8. Process of claim 2 wherein the monomer is a vinyl quaternary ammonium salt derived from dialkylaminoalkyl methacrylate together with acrylamide.

9. Process of claim 2 wherein the monomer is β-methacryloyloxyethyltrimethylammonium methyl sulfate together with acrylamide.

10. Process of claim 2 wherein the conomer is a vinyl pyridinium salt together with acrylamide.

11. Process of claim 2 wherein the monomer is a vinyl pyridinium salt derived from 2-methyl-5-vinyl pyridine together with acrylamide.

12. Process of claim 2 wherein the monomer is 1,2-dimethyl-5-vinyl pyridinium methyl sulfate together with acrylamide.

13. Process of claim 2 wherein the monomer is a vinyl pyrrolidone together with acrylamide.

14. Process of claim 2 wherein the monomer is 1-vinyl-2-pyrrolidone together with acrylamide.

15. Process of claim 2 wherein the monomer is acrylic acid together with acrylamide.

16. Process of claim 2 wherein the monomer is acrylonitrile together with acrylamide.

17. Process of claim 2 wherein the monomer is β-methacryloyloxyethyltrimethylammonium methyl sulfate together with methacrylamide.

18. Process of claim 2 wherein the monomer is 1,2-dimethyl-5-vinyl pyridinium methyl sulfate together with acrylamide.

19. Process of claim 2 wherein the monomer is sodium acrylate together with acrylamide.

References Cited

UNITED STATES PATENTS

| | | | |
|---|---|---|---|
| 2,764,578 | 9/1956 | Barney | 260—80.3 |
| 3,006,900 | 10/1961 | Fikentscher et al. | 260—80.3 |
| 3,008,851 | 11/1961 | Zeitschel | 260—89.3 |
| 3,040,012 | 7/1962 | Maeder | 260—80.3 |
| 3,062,785 | 11/1962 | Laakso et al. | 260—89.7 |
| 3,235,490 | 2/1966 | Goren | 260—89.7 |
| 3,254,138 | 5/1966 | Hagemeyer | 260—85.5 |
| 3,265,654 | 8/1966 | Glabisch et al. | 260—79.3 |

OTHER REFERENCES

Hill et al.: Journ. Poly. Sci., vol. 47 (1960), pages 397–402.

JOSEPH L. SCHOFER, *Primary Examiner.*

D. K. DENENBERG, *Assistant Examiner.*